Jan. 21, 1930.  A. LENTON  1,744,232
AUTOMATIC WEIGHING AND WEIGHT TOTALIZING APPARATUS
Filed Oct. 24, 1928   2 Sheets-Sheet 1
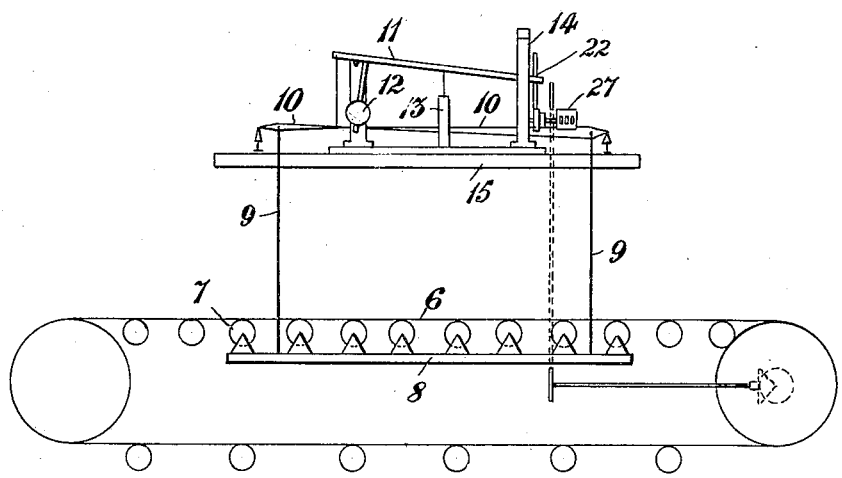
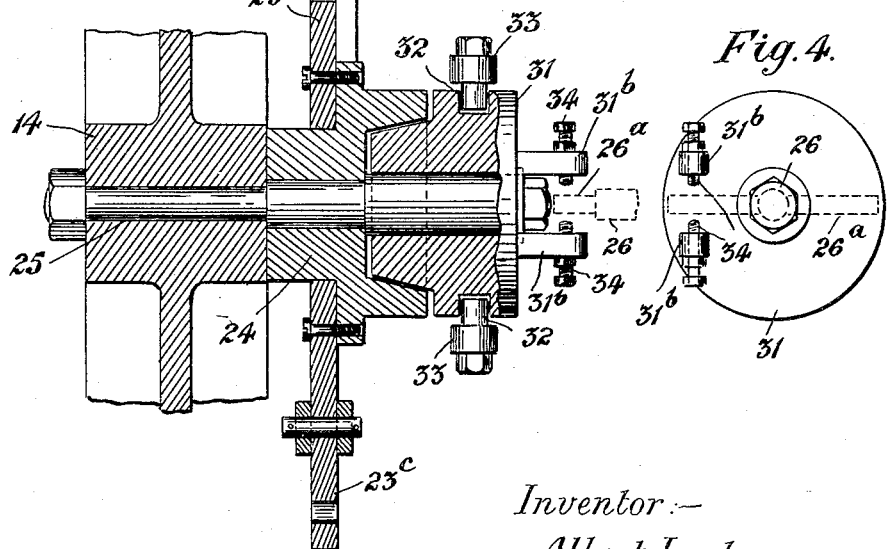
Inventor:—
Albert Lenton
by George E. Folkes
his Attorney Jan. 21, 1930.   A. LENTON   1,744,232
AUTOMATIC WEIGHING AND WEIGHT TOTALIZING APPARATUS
Filed Oct. 24, 1928   2 Sheets-Sheet 2
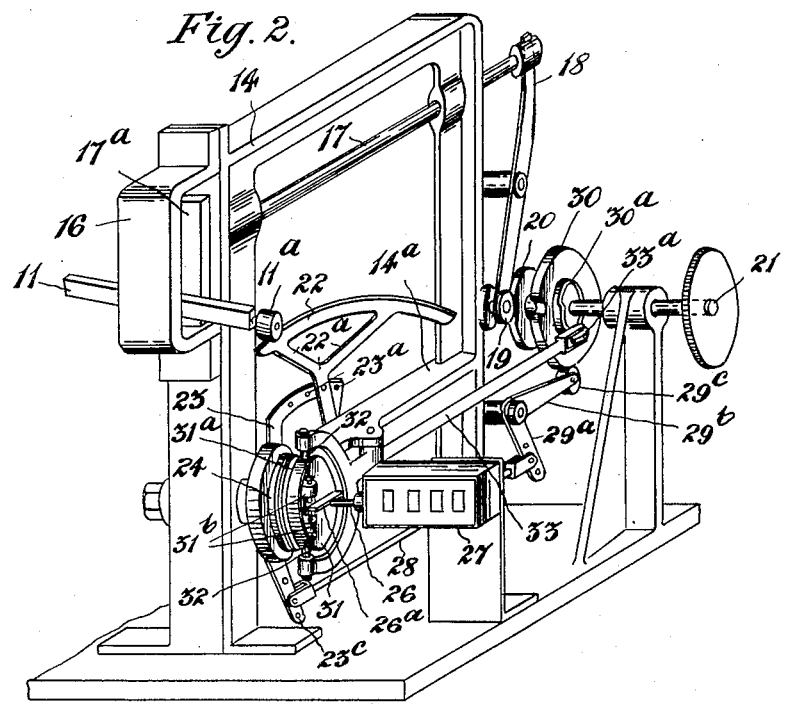
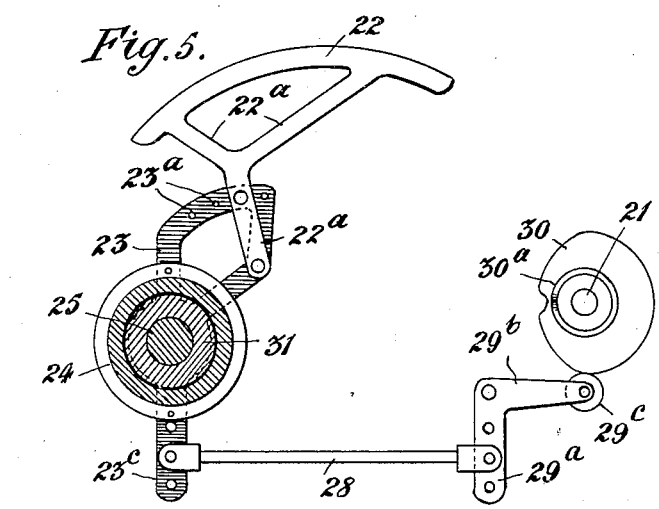
Inventor:—
Albert Lenton
by George E. Folkes.
his Attorney Patented Jan. 21, 1930

1,744,232

UNITED STATES PATENT OFFICE

ALBERT LENTON, OF LEEDS, ENGLAND, ASSIGNOR TO SAMUEL DENISON & SON LIMITED, OF HUNSLET FOUNDRY, LEEDS, ENGLAND

AUTOMATIC WEIGHING AND WEIGHT-TOTALIZING APPARATUS

Application filed October 24, 1928, Serial No. 314,719, and in Great Britain July 31, 1928.

This invention has reference to improvements in or relating to automatic weighing and weight totalizing apparatus and is concerned particularly with automatic weighing and totalizing apparatus of the kind described and claimed in the British Patent Specifications Nos. 9339/95 and 3351/09.

The present invention has for its object the provision of an improved weighing and weight totalizing apparatus of the aforesaid kind which is capable of being adapted readily for use with weighing apparatus of varying capacities and which is provided with a simplified clutch mechanism for permitting of the automatic correction of the excess weight that would normally be communicated to the totalizer during the sequence of a weighing operation and with means for preventing the transmission of motion to the totalizer during the said correction operation.

The invention consists of an improved automatic weighing and weight totalizing apparatus of the kind hereinbefore referred to, wherein means are provided for varying the initial position of the measuring member relatively to the co-operating steelyard whereby the disposition of the said measuring member relatively to the steelyard can be adjusted in order to enable a standard form of weighing and totalizing mechanism to be adapted readily for use with weighing apparatus of varying capacities. The invention also resides in the provision of an improved clutch mechanism which serves to effect both the coupling of the measuring member to the totalizer and also to admit of the automatic compensation for excess motion imparted to the measuring member during the course of a weighing operation. The invention resides further in the provision, between the clutch member and the driving spindle of the totalizer, of a lost motion device the degree of lost motion permitted whereto may be varied, as required, in order to ensure that the movement of the clutch obtaining during the compensating operation shall not be transmitted to the totalizing mechanism. The invention still further resides in the details of construction of the automatic recording and totalizing apparatus to be described hereinafter.

The invention will now be described with particular reference to the accompanying sheet of drawings, wherein:

Figure 1 is a diagrammatic representation of a complete automatic weighing and weight totalizing apparatus constructed in accordance with the invention.

Figure 2 is a perspective view on a larger scale of the weight totalizing mechanism and its adjacent parts.

Figure 3 is a detail sectional view of the clutch mechanism.

Figure 4 is an end view of the outer section of the clutch, and

Figure 5 is a diagrammatic view illustrating the measuring member and its co-operating mechanism.

In the drawings like numerals of reference indicate similar parts in the several views.

The upper section of the conveyor belt 6, on to which the material to be weighed is fed, is passed over rollers 7 carried by a platform 8 which is suspended by rods 9 from a pair of levers 10. These levers 10 are connected to one end of a steelyard 11 which is provided with a pendulous automatic resistant 12 and which has connection with a mercury dashpot 13 as is described in the British Patent Specifications Nos. 9339/95 and 3351/09. The free end of the steelyard 11 projects through the rectangularly shaped space obtaining between the outer side of one of the side members of a rectangular frame 14 bolted to the base 15 of the weighing mechanism and the adjacent face of a bracket 16 secured to the said side member of the frame 14. Slidably or pivotally mounted in the frame 14 adjacent the upper end thereof is a rod 17 carrying at one end a clamping plate 17ª. The said rod 17 is provided with spring weighted or other means (not shown) whereby the clamping plate 17ª tends normally to press the steelyard against the inner face of the bracket 16. The other end of the rod 17 is secured to the upper end of a lever 18 the lower end whereof is provided with a roller 19 which bears against and co-operates with a cam 20 mounted on the driving shaft 21 which is driven from a power source at a predetermined speed in known manner.

The free end of the steelyard 11 is provided with a roller 11ª although other forms of abutment may be used, if preferred, which, during a weighing operation, contacts with the arcuately shaped periphery of a pivotally mounted measuring member. The aforesaid measuring member comprises an arcuate section 22 which is carried by three arms 22ª arranged preferably in a substantially Y formation the lowermost of these arms 22ª being pivoted at its lower end on a carrying member 23 provided adjacent to its upper end with a curved portion having therein a plurality of preferably equi-distantly spaced holes 23ª adapted to be brought into register with a hole in the lowermost arm of the arcuate section and a bolt passed through the registering holes whereby the position of the said section 22 relatively to the carrying member 23 may be varied, as desired. The carrying member 23 is provided at its centre with an annular section 23ᵇ which is screwed to a member 24 having therein an aperture whereby the said member 24 may be freely mounted on a shaft 25 fixed in the frame 14 and arranged coaxially with the spindle 26 of a totalizing mechanism 27. The carrying member 23 is provided with a downwardly projecting crank 23ᶜ which is pivotally connected to one end of a rod 28 the other end whereof is pivotally connected to the downwardly projecting arm 29ª of a bell crank lever. The crank 23ᶜ and the downwardly projecting arm 29ª of the bell crank lever are formed with a plurality of preferably equi-distantly spaced holes adapted to receive the pivot pins for connecting the rod to the said crank and arm, the plurality of holes provided enabling the pivotal point of the rod relatively to the measuring member to be varied and also the ratio of the lengths of the arms of the bell crank lever. The other arm 29ᵇ of the bell crank lever is provided with a roller 29ᶜ which co-operates with a cam 30 mounted on the driving shaft 21. Freely mounted on the shaft 25 is the one section 31 of a cone clutch the other section whereof is formed in the member 24. The clutch section 31 is provided with a peripheral groove 31ª within which engage a pair of opposite and vertically disposed pins 32 carried in jaws formed at the one end of a lever 33 which is fulcrumed intermediate its ends on a cross bar 14ª carried by the frame. The other end of the clutch lever 33 is provided with a roller 33ª which is mounted on a vertically disposed pin, said roller being maintained in contact with a cam surface 30ª formed on the outer face of the cam 30 which co-operates with a bell crank lever. The section 31 of the clutch carried by the jaws is provided on its outer face with a pair of lugs 31ᵇ having therein tapped apertures through which are passed a pair of screw bolts 34. These bolts are disposed one on either side of but spaced from a plate 26ª which is fixed to the spindle 26 of the totalizer, the said bolts serving to transmit motion to the totalizer when the clutch is rotated in a manner to be described hereinafter.

The operation of the invention is as follows:—

When the steelyard 11 reaches equilibrium upon the application of a load the cam 20 controlling the operation of the rod 17 carrying the clamping plates 17ª permits the said plate 17ª to move toward the steelyard and to lock the steelyard 11 against the inner face of the bracket 16. Immediately subsequent to the locking of the steelyard 11 the cam 30 co-operating with the bell crank lever admits of the measuring member turning freely relatively to the shaft 25 until the arcuate contact making section 22 of the said member comes into contact with the roller 11ª on the free end of the steelyard 11. When contact is established between the arcuate section 22 and the roller 11ª the clutch controlling cam 30ª causes the clutch lever 33 to rock about its pivot and to effect the engagement of the clutch whereupon the continued rotation of the driving shaft 21 causes the cam 30 governing the measuring member to bear on the roller 29ᶜ carried by the arm 29ᵇ of the bell crank lever and, through the rod 28 pivotally connected thereto and the crank 23ᶜ, to effect the return of the measuring member to the position of rest. As during this operation the clutch is engaged it will be seen that the motion of the measuring member is transmitted, through the bolts 34, plate 26ª and spindle 26, to the totalizer 27 whereby a record of the load is obtained. When the measuring member has been returned to its normal position of rest the cam face 30ª on the measuring member cam 30 effects the disconnection of the clutch.

With mechanism of the aforesaid kind it is necessary, in returning the measuring member to its normal position of rest, to impart an excess rearward movement to the measuring member so as to prevent contact between the said member and the steelyard 11 when the steelyard is returned to the no-load position and this excess movement of the measuring member, unless compensated for, would effect an addition to the weight already recorded by the totalizer. The correction is effected automatically by the mechanism described hereinbefore in the following manner:—

In the measuring operation the measuring member as a whole is permitted, by its cam 30, to oscillate in a forward direction until the periphery of the arcuate section 22 comes into contact with the roller 11ª on the steelyard 11. When this is attained the clutch cam 30ª allows the clutch to be engaged and the measuring member moves backwards under the control of its cam 30 to the normal position of rest whereupon the clutch is disengaged. This normal position of rest is a definite angular distance rearwards from the position in which the measuring member makes contact with the steelyard when the steelyard is in the no-load position and this angular distance would be added to the totalizer were it not for the equal subtraction and lost motion in the totalizer drive.

The compensation for the excess angular movement referred to is effected by the cam 30 governing the measuring member causing the measuring member now to move in a rearward direction to an amount equal to the excess angular motion hereinbefore referred to and through which distance the measuring member has just been moved rearwards in engagement with the clutch but during this second rearward movement the clutch is disengaged. When the second backward movement has been completed the clutch is re-engaged and the measuring member returned to its normal position of rest and the clutch withdrawn.

The return of the cam driven parts is effected in the usual manner by means of a balance weight or equivalent mechanical means.

It will be seen that this operation effects automatically the compensation for the movement of the measuring member necessary to allow the steelyard to return to and to remain free in the no-load position.

By reason of the fact that the motion is transmitted from the measuring member to the totalizer through the bolts 32 carried by the male clutch member it will be seen that by suitably adjusting the bolts the compensating movement of the measuring member, which is only of a small extent, may be effected without the said movement being communicated to the totalizer.

An automatic weighing and weight totalizing apparatus constructed as hereinbefore described admits of the employment of a standard type of weighing and totalizing mechanism with weighing machines of varying capacities, and furthermore, provides a simple and more efficient apparatus of this kind than heretofore.

What I claim is:—

1. An automatic weighing and weight totalizing apparatus embodying a load receiving section, a steelyard weighing mechanism, means for connecting said load receiving section to the weighing mechanism, means for effecting intermittently a locking of the steelyard when in the equilibrium position, a pivotally mounted measuring member, means for moving the measuring member into and out of contact with the steelyard, a weight totalizer, a clutch for connecting the measuring member to the totalizer and for transmitting to the totalizer each measuring movement imparted to the measuring member, means for effecting the intermittent engagement and disengagement of said clutch and means for effecting the initial adjustment of the measuring member relatively to the steelyard in order to enable a standard weighing and weight totalizing mechanism to be adapted readily for use with weighing apparatus of varying capacities.

2. An automatic weighing and weight totalizing apparatus embodying a load receiving section, a steelyard weighing mechanism, means for connecting said load receiving section to the weighing mechanism, means for effecting intermittently a locking of the steelyard when in the equilibrium position, a pivotally mounted measuring member, means for moving the measuring member into and out of contact with the measuring member, a weight totalizer, a clutch for connecting the measuring member to the totalizer and for transmitting to the totalizer each measuring movement imparted to the measuring member, means for effecting the intermittent engagement and disengagement of said clutch, means for effecting an initial adjustment of the measuring member relatively to the steelyard in order to enable a standard weighing and weight totalizing mechanism to be adapted readily for use with weighing apparatus of varying capacities and means for effecting an automatic compensation for excess motion imparted to the measuring member during the course of a totalizing operation.

3. An automatic and weight totalizing apparatus embodying a load receiving section, a steelyard weighing mechanism, means for connecting said load receiving section to the weighing mechanism, means for effecting intermittently a locking of the steelyard when in the equilibrium position, a pivotally mounted measuring member, means for moving the said measuring member into contact with the steelyard when in the locked position and for returning the measuring member subsequently to its normal position of rest, a weight totalizer, a clutch for connecting the measuring member to the totalizer and for transmitting to the totalizer each measuring movement imparted to the measuring member, means for effecting the intermittent engagement and disengagement of said clutch, means for effecting the initial adjustment of the measuring member relatively to the steelyard in order to enable a standard weighing and weight totalizing mechanism to be adapted readily for use with weighing apparatus of varying capacities and a lost motion connection between the clutch and the totalizer whereby an automatic compensation may be obtained in respect of the excess motion imparted to the measuring member during the course of a totalizing operation.

4. An automatic weighing and weight totalizing apparatus embodying a load receiving section, a steelyard weighing mechanism, means for connecting said load receiving section to the weighing mechanism, a driving shaft, means for effecting intermittently a locking of the steelyard in the equilibrium position the operation of said means being controlled by a member driven from the driving shaft, a pivotally mounted measuring member, a cam driven from the driving shaft and adapted to effect the movement of the said measuring member into contact with the steelyard in the locked position and also the return of the measuring member subsequently to its normal position of rest, a weight totalizer, a clutch for connecting the measuring member to the totalizer and for transmitting to the totalizer each measuring movement imparted to the measuring member, a cam driven from the driving shaft and adapted to effect the intermittent engagement and disengagement of the said clutch, and means for effecting the initial adjustment of the measuring member relatively to the steelyard in order to enable a standard weighing and totalizing mechanism to be adapted readily for use with weighing apparatus of varying capacities.

5. An automatic weighing and weight totalizing apparatus embodying a load receiving section, a steelyard weighing mechanism, means for connecting said section to the weighing mechanism, means for effecting intermittently a locking of the steelyard in the equilibrium position, a driving shaft, means driven from said driving shaft and adapted for controlling the operation of the means for effecting the intermittent locking of the steelyard, a pivotally mounted arm, an arcuate measuring member the periphery whereof is adapted to be moved into and out of contact with the steelyard, means for effecting an adjustment of the said member relatively to the arm, a cam driven from the driving shaft and adapted to effect the movement of the said measuring member into contact with the steelyard when in the locked position and also the return of the measuring member subsequently to its normal position of rest, a weight totalizer, a clutch for connecting the measuring member to the totalizer, and for transmitting to the totalizer each measuring movement imparted to the measuring member, a clutch lever for effecting the engagement and disengagement of the said clutch, a cam driven from the driving shaft and adapted to cause the said clutch lever to effect an intermittent engagement and disengagement of said clutch, a cam driven from the driving shaft and adapted to cause the said clutch lever to effect an intermittent engagement and disengagement of said clutch and means for effecting an automatic compensation for the excess motion imparted to the measuring member during the course of a weighing operation.

6. An automatic weighing and weight totalizing apparatus embodying a load receiving section, a steelyard weighing mechanism, means for connecting said section to the weighing mechanism, a driving shaft, means driven by said driving shaft for effecting intermittently a locking of the steelyard when in the equilibrium position, a pivotally mounted arm, an arcuate measuring member adapted to be moved into and out of contact with the steelyard, means for effecting an initial adjustment of the measuring member relatively to the said arm, a crank fixed relatively to said arm, a bell crank lever, means for connecting said bell crank to one arm of the bell crank lever, a cam driven from the driving shaft and adapted to be in operative engagement with the other arm of the bell crank lever said cam permitting the movement of the measuring member into contact with the steelyard when in the equilibrium position and effecting the subsequent return of the measuring member to its normal position of rest, means for varying the radius of action of the point of connection of the connecting rod to the crank, means for effecting a variation in the ratio of the effective lengths of the arms of the bell crank lever, a weight totalizer, a clutch for connecting the pivotally mounted arm to the totalizer and for transmitting to the totalizer each measuring movement imparted to the measuring member, a clutch lever for effecting the engagement and disengagement of said clutch, means driven from the driving shaft for causing the intermittent engagement and disengagement of the clutch and a lost motion connection between the clutch and the totalizer for permitting of an automatic compensation for the excess motion imparted to the measuring member during the course of a weighing operation.

In testimony whereof, I have signed my name to this specification.

ALBERT LENTON.